Jan. 15, 1952     O. H. KAHLER     2,582,754
BOAT TROLLER

Filed April 10, 1950

Oscar H. Kahler
INVENTOR.

BY *Clarence A. O'Brien*
*and Harvey B. Jacobson*
Attorneys

Patented Jan. 15, 1952

2,582,754

UNITED STATES PATENT OFFICE 2,582,754

BOAT TROLLER

Oscar H. Kahler, Pueblo, Colo.

Application April 10, 1950, Serial No. 154,936

2 Claims. (Cl. 43—43.13)

This invention relates to a trolling device for attachment to a fishing boat a primary object of which is to permit the fisherman to troll for fish any desired distance from the boat.

Another important object of this invention is to provide a trolling device which will eliminate entanglement of the trolling line and thereby improve the chances of catching fish.

A further important object of this invention is to provide a trolling device including a rudder which may be adjusted to any desired angle so that the device can be held at any desired distance from the boat.

A further important object of this invention is to provide a trolling device of the character described which is relatively simple in design and construction, inexpensive to manufacture, simple to assemble for use, easy to operate, and very efficient for its intended purpose.

These, together with various ancillary objects and features of the invention which will later become apparent as the following description proceeds, are attained by the device, a preferred embodiment of which has been illustrated by way of example only in the accompanying drawings, wherein.

Specific reference is now made to the drawings. In the several views in the accompanying drawings and in the following specification similar reference characters indicate corresponding elements throughout.

Figure 1:
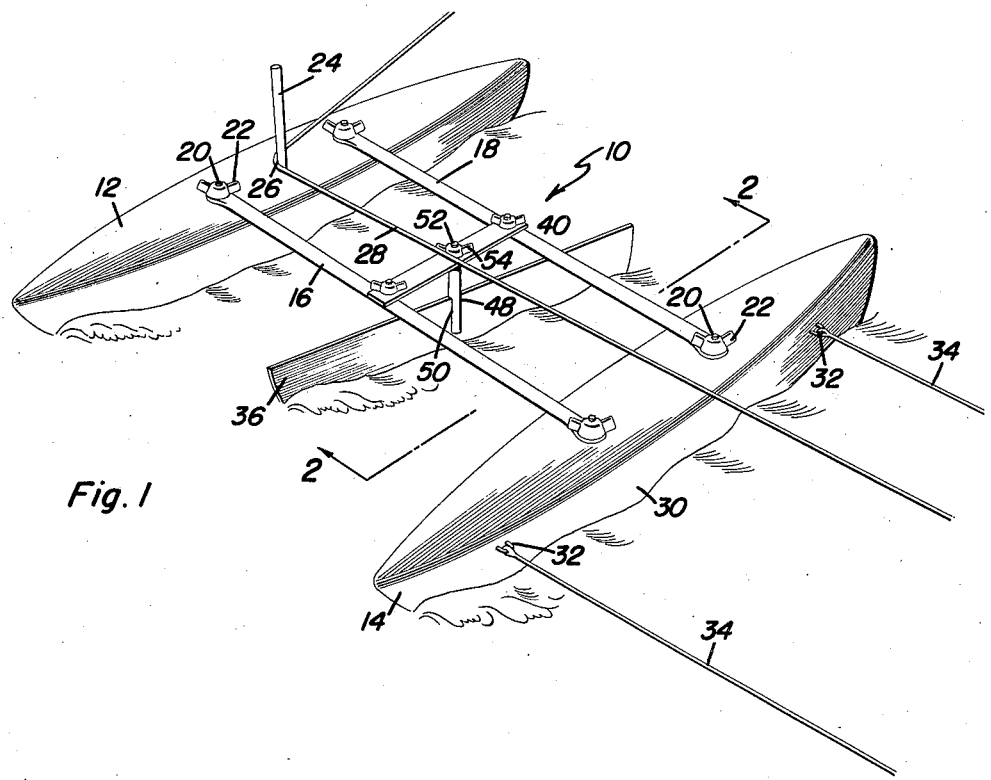
Figure 1 is a perspective view of the assembled device.

The present trolling device is indicated generally at 10 and includes a pair of air-tight floatable pontoons 12 and 14 of conventional shape and design. The pontoons are held together in spaced relationship to each other by means of a pair of parallel solid rods 16 and 18 which extend between and across the pontoons, the ends of the rods being secured to the top surface of the pontoons by means of screws 20 and closure nuts 22 therefor. The pontoon 12 includes a vertical or upstanding rod 24 about which is hooked as at 26 a trolling line 28 which extends parallel between the solid rods 16 and 18 and goes back to the fishing boat (not shown). The side 30 of the pontoon 14 includes hooks 32 adjacent its ends for receiving drag lines 34 which are in turn attached to the fishing boat.

Figure 2:
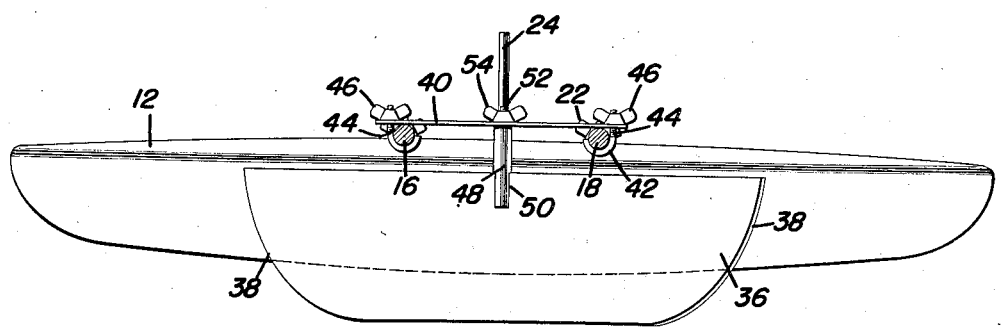
Figure 2 is a sectional view taken substantially on the plane of section line 2—2 of Figure 1.

To maintain the trolling device at any desired distance from the fishing boat, a rudder 36 is provided in the form of a substantially flat plate having arcuate side edges 38. A means is provided for retaining the rudder between the pontoons in such a manner that the rudder may be adjustably moved towards or away from any one of the pontoons and also at a desired fixed angle between the pontoons. This means comprises a relatively flat bar 40 which extends across the rods 16 and 18 and parallel to the pontoons. J-shaped hooks 42 are provided, each slidably embracing each of the rods 16 and 18, as shown clearly in Figure 2. Each of the J-hooks includes a threaded extension 44 which is positioned through a suitable aperture in the bar 40 adjacent one of its ends, the threaded extension receiving a closure or wing nut 46. Thus it will be seen that when the wing nuts 46 are loosened, the bar 40 may be moved towards or away from either one of the pontoons and retained in a desired fixed position therebetween by tightening the nuts on the threaded extensions against the bar 40.

A stub shaft 48 is provided which includes an axial slit 50 through its bottom end for tightly securing and receiving the rudder 36 which is held in a substantially vertical position as shown in the drawings. The upper end of the stub shaft 48 is provided with a reduced threaded extension 52 which is rotatably received in a suitable aperture in the bar 40 intermediate its ends and a wing closure nut 54 is in turn received on the threaded extension 52. Thus it will be seen that when the closure nut 54 is loosened, the rudder 36 may be rotated to any desired angulated position relative to the pontoons and can be maintained in this desired position by tightening the closure nut 54 against the bar 40. If desired, fastening pins may be employed to secure the rudder 36 in the stub shaft 48, the fastening pins extending through the axially split portion of the shaft and suitable apertures in the rudder.

In use, the rudder 36 is moved towards or away from either one of the pontoons 12 and 14 by means of the closure nuts 46 and the J-hoops 42 and the angulated position of the rudder may be set at any desired point by means of the closure nut 54 and the rotatable stub shaft 48. This setting permits the trolling device 10 to be pulled in the water beside the fishing boat at any desired distance therefrom and the trolling line 28, although it is hooked around the vertical rod 24, is movable relative to the trolling device. The entire trolling device may be quickly secured to a fishing boat by means of the drag lines 34.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A trolling device comprising a pair of pontoons, elongated spaced parallel rods extending between and terminally secured to said pontoons to hold them in spaced parallel relation, means for securing one of said pontoons to a fishing boat, a trolling line extending between said rods, means for retaining said trolling line on the other of said pontoons, a rudder, means for retaining said rudder in longitudinally adjusted position on said rods between said pontoons, and means for adjustably securing said rudder on said rudder retaining means at a desired angle between and relative to said pontoons, wherein said second-named means includes a vertical rod carried by said other pontoon, said trolling line hooking around said vertical rod.

2. A trolling device comprising a pair of pontoons, elongated spaced parallel rods extending between and terminally secured to said pontoons to hold them in spaced parallel relation, means for securing one of said pontoons to a fishing boat, a trolling line extending between said rods, means for retaining said trolling line on the other of said pontoons, a rudder, means for retaining said rudder in longitudinaly adjusted position on said rods between said pontoons, and means for adjustably securing said rudder on retaining means at a desired angle between and relative to said pontoons, wherein said rudder is a vertical flat plate, said third-named means including a bar extending across said rods and securing said rudder and hook means adjacent the ends of said bar for slidably and adjustably retaining the latter on said rods.

OSCAR H. KAHLER.

REFERENCES CITED

The following references are of record in the file of this patent:

UNITED STATES PATENTS

| Number    | Name      | Date           |
|-----------|-----------|----------------|
| 1,307,623 | Edmondson | June 24, 1919  |
| 1,336,226 | Hart      | Apr. 6, 1920   |
| 1,361,602 | Marks     | Dec. 7, 1920   |
| 1,466,601 | Sanders   | Aug. 28, 1923  |
| 1,723,236 | Hansen    | Aug. 6, 1929   |
| 2,006,156 | Bonanno   | June 25, 1935  |